(12) United States Patent
Lupsa et al.

(10) Patent No.: US 8,998,154 B2
(45) Date of Patent: Apr. 7, 2015

(54) FIELD INSTALLABLE SUPPORT BRACKET ASSEMBLY

(71) Applicant: Thomas & Betts International, Inc., Wilmington, DE (US)

(72) Inventors: Ioan-Liviu Lupsa, Dollard-des-Ormeaux (CA); Michele Di Lillo, Chambly (CA); Daniel Lalancette, St-Jean-sur-Richelieu (CA); Brian MacDonald, St-Jean-sur-Richelieu (CA); Marc-Antoine Veillette, Ange-Gardien (CA)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 14/035,353

(22) Filed: Sep. 24, 2013

(65) Prior Publication Data

US 2014/0131544 A1    May 15, 2014

Related U.S. Application Data

(60) Provisional application No. 61/724,307, filed on Nov. 9, 2012.

(51) Int. Cl.
    *E04G 25/00* (2006.01)
    *H02G 3/12* (2006.01)

(52) U.S. Cl.
    CPC ...................................... *H02G 3/12* (2013.01)

(58) Field of Classification Search
    CPC .......... H02G 1/00; H02G 3/125; H02G 3/126; Y10S 248/906; H01R 13/518; F21V 21/02; B60T 17/046; E04B 2001/405; F16L 3/24
    USPC .......... 248/200.1, 200, 201, 205.1, 300, 68.1, 248/56, 57, 906, 342, 343, 316.8, 298.1
    See application file for complete search history.

(56) References Cited

U.S. PATENT DOCUMENTS

| | | |
|---|---|---|
| 1,288,024 A | 12/1918 | Kendig |
| 2,316,389 A | 4/1943 | Atkinson |
| 2,528,418 A | 10/1950 | Buckels |

(Continued)

FOREIGN PATENT DOCUMENTS

| | | |
|---|---|---|
| CA | 2050958 A1 | 5/1992 |
| CA | 2028652 A1 | 9/1993 |

(Continued)

*Primary Examiner* — Nkeisha Smith
(74) *Attorney, Agent, or Firm* — Snyder, Clark, Lesch & Chung, LLP

(57) ABSTRACT

A field installable support bracket assembly for an electrical box, wherein the electrical box is to be secured to a side surface of a first structural stud. The field installable support bracket assembly includes a stud bracket and an adjustable back bracket. The stud bracket includes a stud bracket member configured to be secured to a front surface of a second structural stud, and a stud bracket guiding rib. The adjustable back bracket includes a mounting panel configured to be secured to a back of the electrical box, and a back bracket guiding rib. The back bracket guiding rib and the stud bracket are configured to join the stud bracket to the adjustable back bracket. The field installable support bracket assembly is configured to provide support for the electrical box.

20 Claims, 11 Drawing Sheets

(56) References Cited

U.S. PATENT DOCUMENTS

| | | | |
|---|---|---|---|
| 2,962,252 A * | 11/1960 | Edward | 248/231.81 |
| 3,182,805 A | 5/1965 | Foster, Jr. et al. | |
| 3,309,053 A * | 3/1967 | Baker | 248/210 |
| 3,528,636 A * | 9/1970 | Schmidt | 248/57 |
| 3,606,217 A * | 9/1971 | Leiferman | 4/695 |
| 3,834,658 A | 9/1974 | Theodorides | |
| 4,050,603 A | 9/1977 | Harris et al. | |
| 4,062,512 A | 12/1977 | Arnold | |
| 4,165,851 A | 8/1979 | Bowden, Jr. et al. | |
| 4,399,922 A | 8/1983 | Horsley | |
| 4,533,060 A | 8/1985 | Medlin | |
| 4,561,615 A | 12/1985 | Medlin, Jr. | |
| 4,569,458 A | 2/1986 | Horsley | |
| 4,603,789 A | 8/1986 | Medlin, Sr. | |
| 4,747,506 A | 5/1988 | Stuchlik, III | |
| 4,757,967 A | 7/1988 | Delmore et al. | |
| 4,967,990 A * | 11/1990 | Rinderer | 248/205.1 |
| 5,065,968 A | 11/1991 | Kesler et al. | |
| 5,114,105 A * | 5/1992 | Young | 248/27.1 |
| 5,133,094 A * | 7/1992 | Clarke, Jr. | 248/68.1 |
| 5,209,444 A | 5/1993 | Rinderer | |
| 5,253,831 A | 10/1993 | Theodorides | |
| 5,295,644 A | 3/1994 | Ferguson, Jr. | |
| 5,386,959 A | 2/1995 | Laughlin et al. | |
| 5,398,902 A * | 3/1995 | Crowe | 248/300 |
| 5,405,111 A * | 4/1995 | Medlin, Jr. | 248/205.1 |
| 5,516,068 A | 5/1996 | Rice | |
| 5,619,263 A | 4/1997 | Laughlin et al. | |
| 5,927,667 A | 7/1999 | Swanson | |
| 5,931,425 A * | 8/1999 | Oliva | 248/200.1 |
| 5,934,631 A | 8/1999 | Becker et al. | |
| 6,098,939 A * | 8/2000 | He | 248/205.1 |
| 6,098,945 A | 8/2000 | Korcz | |
| 6,209,836 B1 | 4/2001 | Swanson | |
| 6,332,597 B1 | 12/2001 | Korcz et al. | |
| 6,484,979 B1 | 11/2002 | Medlin, Jr. | |
| 6,484,980 B2 * | 11/2002 | Medlin et al. | 248/205.1 |
| 6,590,155 B2 * | 7/2003 | Vrame et al. | 174/50 |
| 6,666,419 B1 * | 12/2003 | Vrame | 248/200.1 |
| 6,765,146 B1 * | 7/2004 | Gerardo | 174/58 |
| 6,889,943 B2 | 5/2005 | Dinh et al. | |
| 7,036,782 B2 | 5/2006 | Cheatham et al. | |
| 7,039,965 B1 * | 5/2006 | Ismert | 4/695 |
| 7,173,186 B1 | 2/2007 | Hageman | |
| 7,191,994 B2 | 3/2007 | Johnson et al. | |
| 7,271,335 B2 * | 9/2007 | Dinh | 174/58 |
| 7,271,336 B2 * | 9/2007 | Dinh | 174/58 |
| 7,312,396 B1 * | 12/2007 | Gorman | 174/58 |
| 7,394,020 B2 * | 7/2008 | Gerardo | 174/58 |
| 7,439,443 B2 | 10/2008 | Dinh | |
| 7,472,875 B2 | 1/2009 | Rinderer | |
| 7,521,631 B2 * | 4/2009 | Dinh | 174/58 |
| 7,592,542 B1 * | 9/2009 | Gerardo | 174/58 |
| 7,595,447 B2 * | 9/2009 | Vrame | 174/58 |
| 7,857,275 B2 | 12/2010 | De La Borbolla | |
| 7,902,457 B2 | 3/2011 | Johnson | |
| 7,956,285 B2 * | 6/2011 | Tally et al. | 174/58 |
| 8,011,628 B1 * | 9/2011 | Suddeth | 248/225.11 |
| 8,403,277 B2 * | 3/2013 | Nuernberger et al. | 248/200.1 |
| RE44,546 E * | 10/2013 | Gorman | 174/58 |
| 2005/0067546 A1 * | 3/2005 | Dinh | 248/343 |
| 2007/0084617 A1 * | 4/2007 | Dinh | 174/58 |
| 2007/0131827 A1 | 6/2007 | Nevers et al. | 248/201 |
| 2008/0011928 A1 * | 1/2008 | Adrian et al. | 248/343 |
| 2010/0110705 A1 * | 5/2010 | Nguyen et al. | 362/432 |

FOREIGN PATENT DOCUMENTS

| | | |
|---|---|---|
| CA | 2005294 A1 | 11/1994 |
| CA | 2178424 A1 | 12/1996 |
| CA | 2216286 A1 | 3/1998 |
| CA | 2147221 A1 | 6/1998 |
| CA | 2260473 A1 | 7/1999 |
| CA | 2342896 A1 | 3/2000 |
| CA | 2302452 A1 | 9/2001 |
| CA | 2339334 A1 | 9/2001 |
| CA | 2106801 A1 | 12/2003 |
| CA | 2461255 A1 | 9/2004 |
| CA | 2482072 A1 | 3/2005 |
| CA | 2606647 A1 | 4/2008 |

* cited by examiner

FIELD INSTALLABLE SUPPORT BRACKET ASSEMBLY

RELATED APPLICATION

This application claims priority under 35 U.S.C. §119, based on U.S. Provisional Patent Application No. 61/724,307 filed Nov. 9, 2012, the disclosure of which is hereby incorporated by reference herein.

BACKGROUND INFORMATION

Electrical boxes are often required to be installed within a wall surface such that the front face of the electrical box is generally flush with the finished wall surface. For example, electrical codes may limit the distance that the front face of an electrical box can be recessed from the finished surface of a wall to no more than one-quarter of an inch. To meet these requirements, electrical boxes may be required to be installed in different configurations depending on the thickness of a metal stud, thickness of a wall surface, and distance from the metal stud (or other mounting surface).

DETAILED DESCRIPTION OF PREFERRED EMBODIMENTS

The following detailed description refers to the accompanying drawings. The same reference numbers in different drawings may identify the same or similar elements.

According to an implementation described herein, a field installable support bracket assembly provides support for an electrical box that is installed on a first structural stud. The position of the electrical box may be adjusted based on a positioning system of the electrical box without measuring a thickness of an associated drywall. The field installable support bracket assembly may be installed between the electrical box and a second structural stud after the box is installed on the first structural stud. The field installable support bracket assembly may include an adjustable back bracket and a stud bracket. The adjustable back bracket is attachable to the electrical box. The stud bracket is attachable to a front surface of the second structural stud. The adjustable back bracket may be adjusted, by changing its position, to adapt the field installable support bracket assembly based on the depth of the electrical box and the thickness of the associated drywall.

Consistent with implementations described herein, a back support for the adjustable back bracket may be bent in order to use the Field Installable Bracket with thinner studs. Alternative implementations may include multiple back supports that may be of varying lengths and may be bent based on the different studs, such as 2×3 studs instead of 2×4 studs.

In descriptions herein, the terms "front" or "forward" may generally refer to a direction from a room's exterior toward a room's interior, and the terms "back," "rear," or "rearward" may generally refer to a direction from a room's interior toward a room's exterior.

Figure 1:
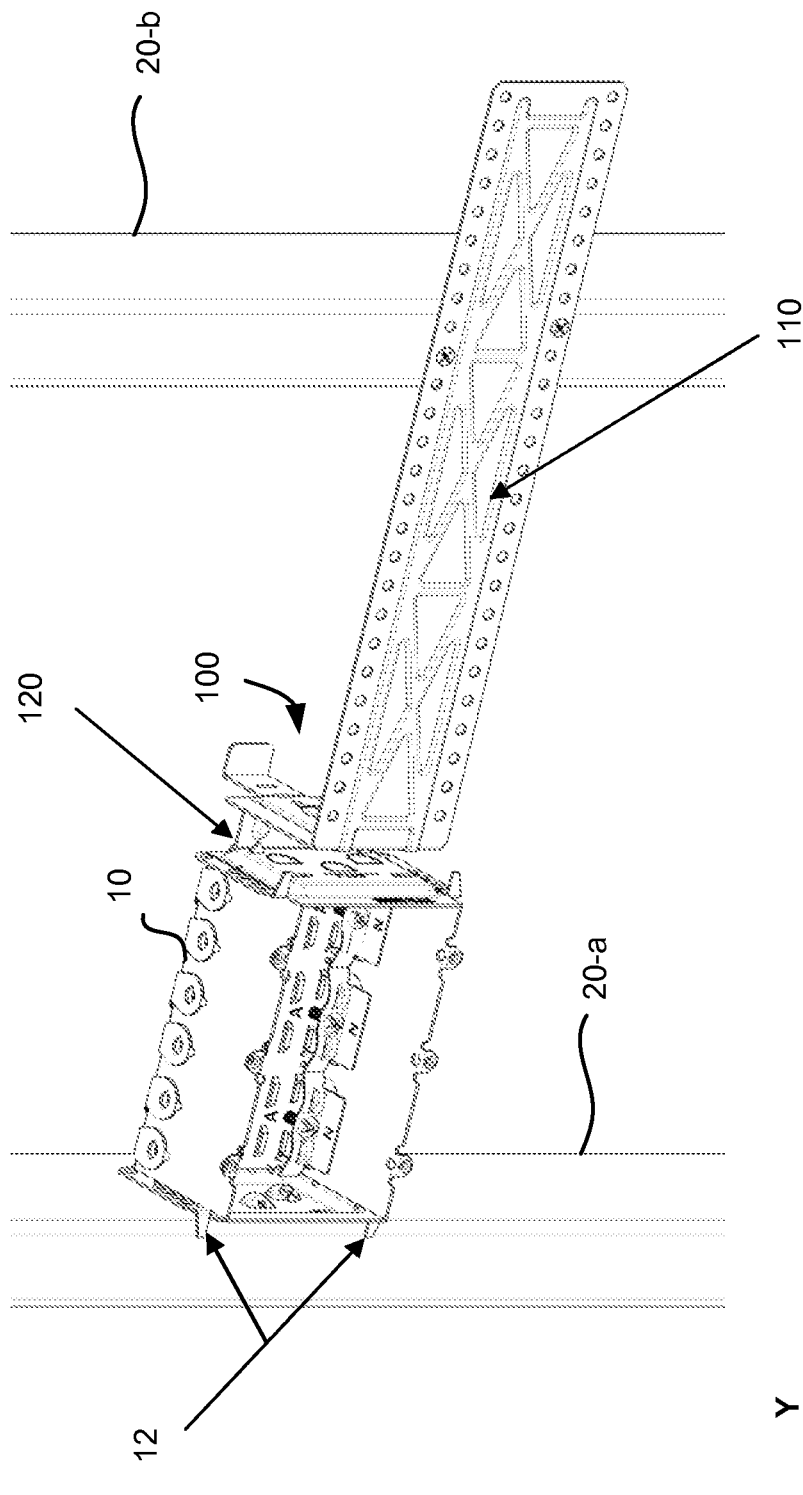
FIG. 1 provides a front perspective view of a field installable support bracket assembly installed between an electrical box and a structural stud according to an implementation described herein.
Figure 2A:
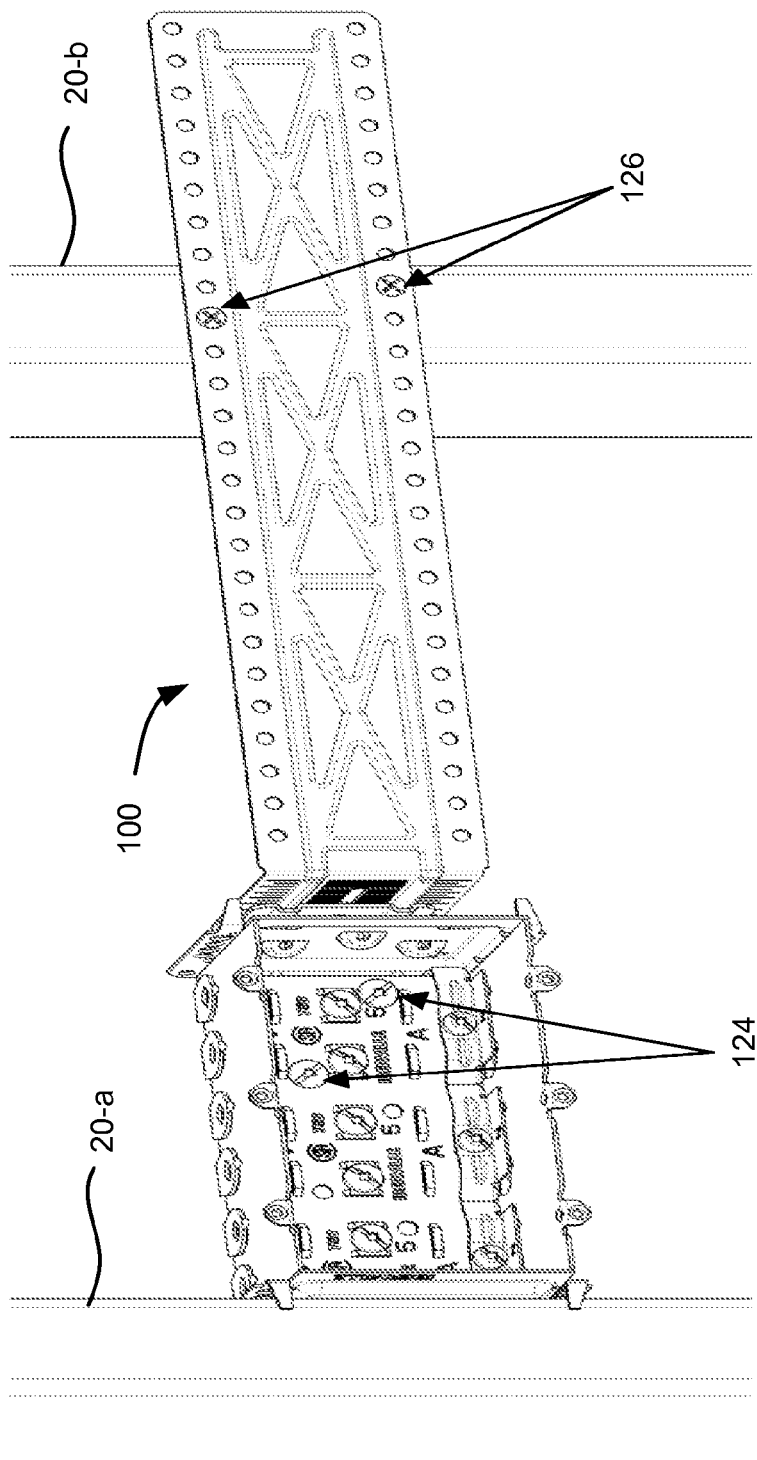
FIGS. 2A and 2B provide a front and rear perspective view, respectively, of the bracket of FIG. 1.
Figure 2B:
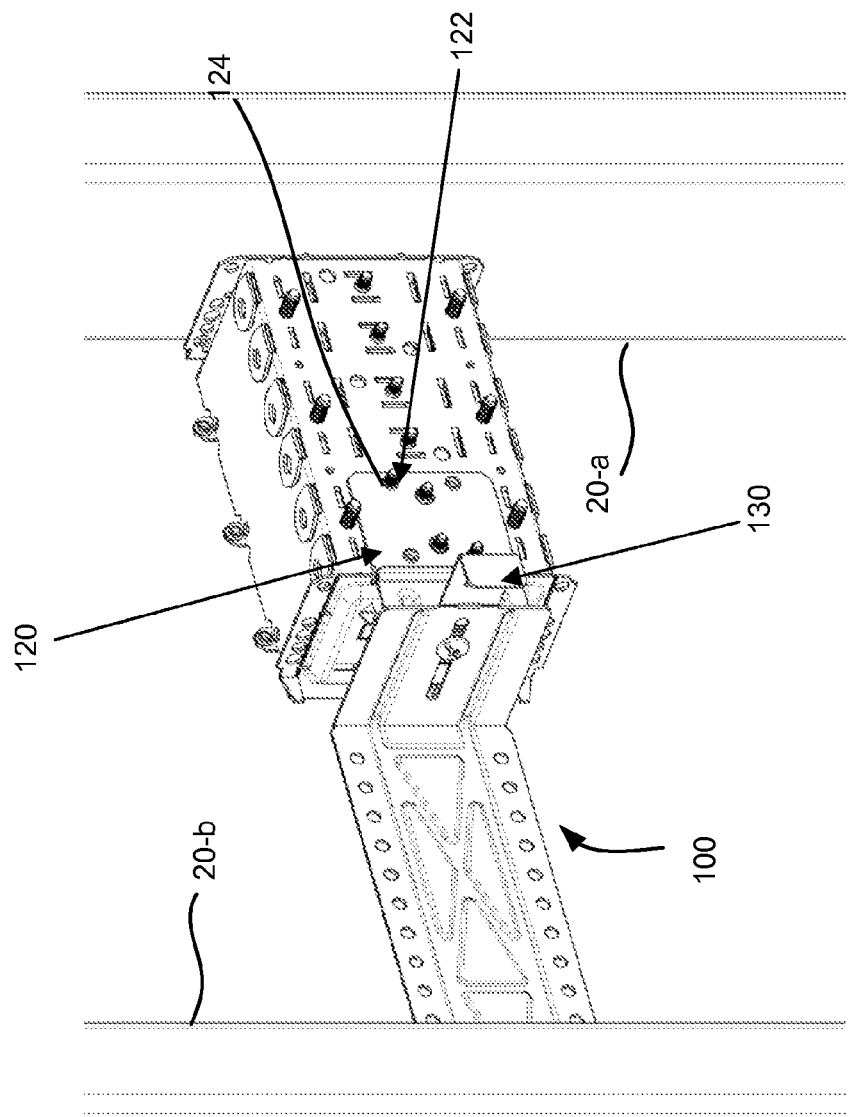
Figure 2B:
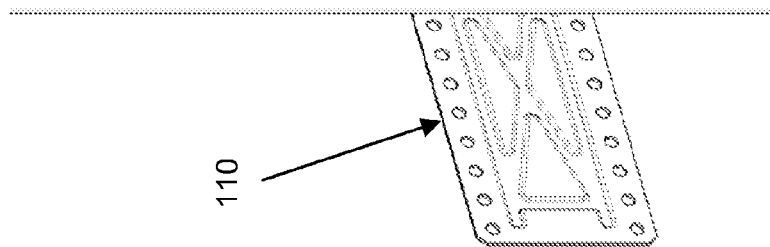

FIG. 1 provides a perspective view of a field installable support bracket assembly 100 supporting an electrical box 10 according to an implementation described herein. Field installable support bracket assembly 100 may include a stud bracket 110 and an adjustable back bracket 120. FIGS. 2A and 2B provide a front and rear perspective view, respectively, of field installable support bracket assembly 100 supporting electrical box 10. Referring collectively to FIGS. 1, 2A and 2B, electrical box 10 may be screwed directly on a first structural stud 20-a and field installable support bracket assembly 100 may be installed between electrical box 10 and a second structural stud 20-b via mounting screws 126. Structural studs 20-a and 20b may be wooden structural studs and/or metal structural studs.

Electrical box 10 may be attached to first structural stud 20-a. The position of electrical box 10 may be adjusted based on a positioning system of electrical box 10 without regard to drywall thickness (not shown in FIG. 1). For example, electrical box 10 may include positioning tabs 12 that may enable correct positioning of electrical box 10 in wall frames. Electrical box 10 may be a single gang or multi-gang box and have particular dimensions (e.g., 2⅜ by 4½ inches) based on the particular box.

Referring now to FIG. 2B, adjustable back bracket 120 may be attached to electrical box 10 after electrical box 10 is installed on first structural stud 20-a. Adjustable back bracket 120 may include mounting holes 122 provided for attaching adjustable back bracket 120 to welded and/or gangable device boxes, such as electrical box 10. A gangable box is a modular box that can be expanded into a casing for multiple devices. Electrical box 10 may include mounting holes (not shown). Mounting holes 122 may be aligned with corresponding holes on electrical box 10. Adjustable back bracket 120 may be attached to the back of electrical box 10, as shown in FIG. 2B, by mounting screws 124 (shown in FIGS. 2A and 2B) through mounting holes 122 (shown in FIG. 2B). The position of adjustable back bracket 120 may be adjusted to adapt field installable support bracket assembly 100 based on the depth of electrical box 10 and the thickness of the associated drywall.

Stud bracket 110 may be fastened on a front surface of second structural stud 20-b by mounting screws 126. Field installable support bracket assembly 100, when installed to support electrical box 10, may have an attachment to electrical box 10 at one end (i.e., adjustable back bracket 120), and with the other end (i.e., stud bracket 110) on the front surface of the second structural stud 20-b, as shown in FIGS. 1 and 2A. Stud bracket 110 may be attached to adjustable back bracket 120, such as described with respect to FIGS. 3A and 3B below. In one implementation, stud bracket 110 may be substantially perpendicular to adjustable back bracket 120.

Field installable support bracket assembly 100 may provide a rigid support for electrical box 10. Adjustable back bracket 120 may allow field installable support bracket assembly 100 to adapt based on the depth of electrical box 10 and the drywall thickness, as described in FIGS. 3A and 3B.

Figure 3A:
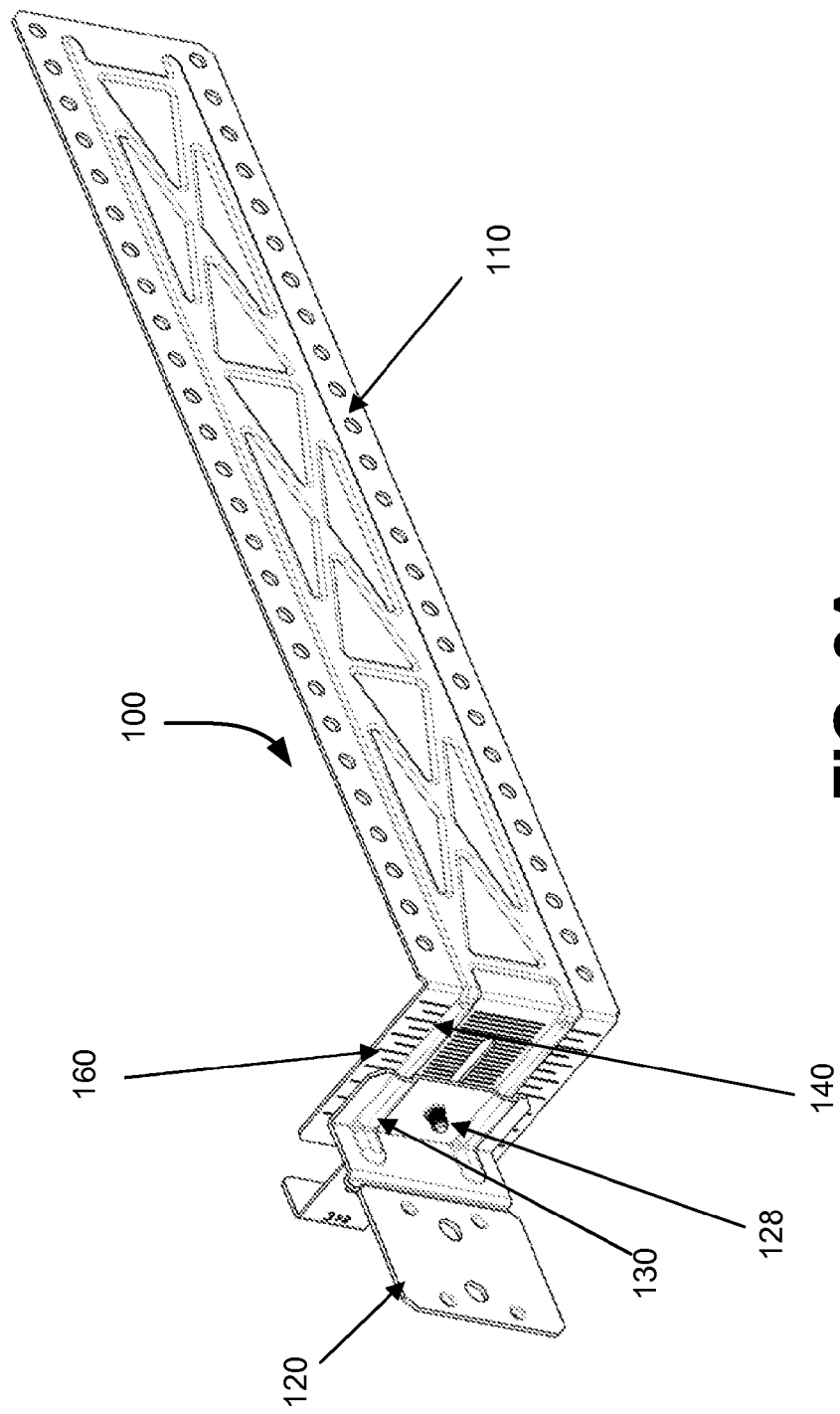
FIGS. 3A and 3B provide a front and rear perspective view, respectively, of the bracket of FIG. 1 with components of an adjustable back bracket.
Figure 3B:
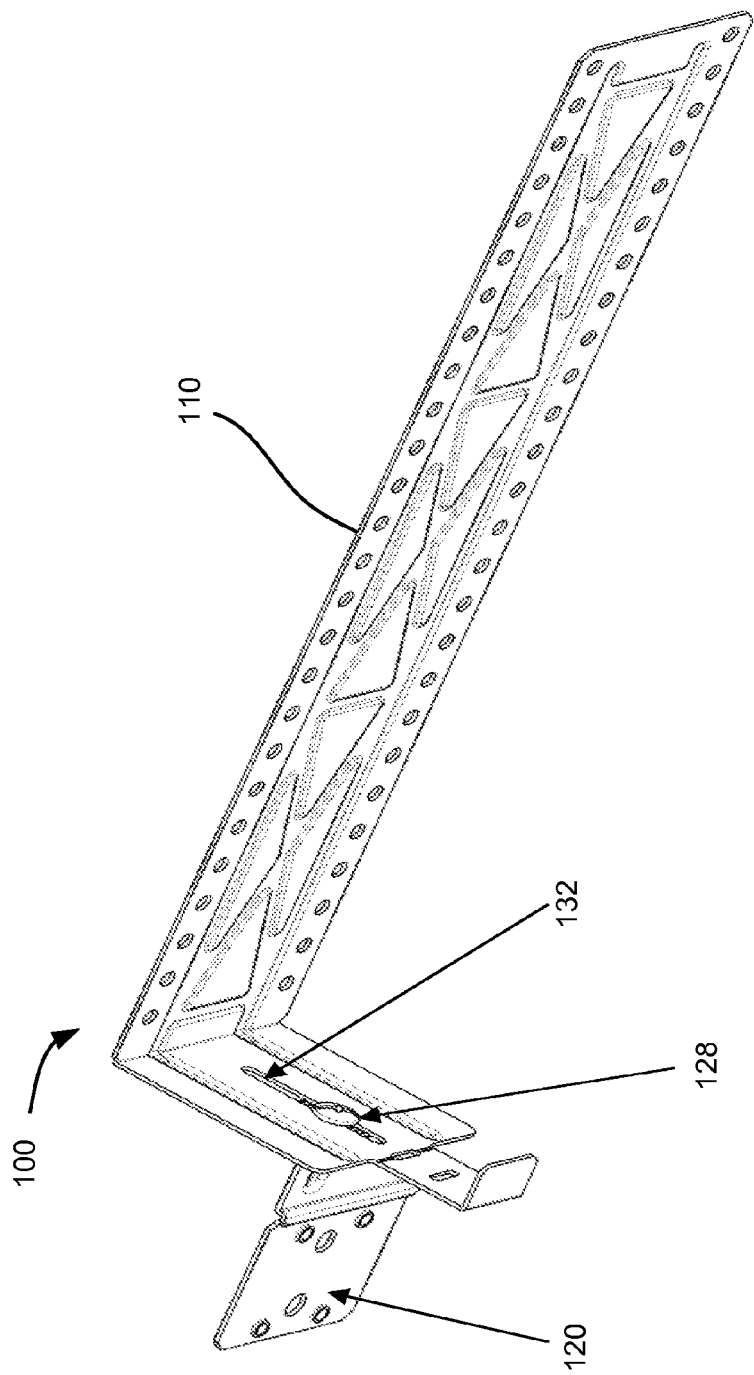

FIG. 3A and 3B provide front and rear perspective views, respectively, of field installable support bracket assembly 100 with components of stud bracket 110 and adjustable back bracket 120. As shown in FIGS. 3A and 3B, field installable support bracket assembly 100 may include stud bracket 110, adjustable back bracket 120, a back bracket guiding rib 130, a slot 132, a stud bracket guiding rib 140, a mounting screw 128, and measuring markings 160.

The combination of guiding ribs 130 and 140, slot 132 and single mounting screw 128, shown in FIGS. 3A and 3B may be implemented to provide bracket adjustment for installation of field installable support bracket assembly 100. For example, adjustable back bracket 120 (i.e., back bracket guiding rib 130) may be slid along stud bracket guiding rib 140 to adjust placement of field installable support bracket assembly 100 to a determined position in a wall frame. Mounting screw 128 may be inserted through slot 126 and tightened when adjustable back bracket 120 is at a desired positioned with regard to stud bracket 110 based on the measuring markings 160. Measuring markings 160 allow uniform installation of multiple field installable support bracket assemblies 100 (i.e., at a same depth for each electrical box 10). In this manner, back bracket 120 may be adjusted to accommodate boxes having different depths while ensuring that a front face of electrical box 10 is flush with or nearly flush with the finished wall surface.

Although field installable support bracket assembly 100 is described with respect to electrical box 10, other alternate constructions of field installable support bracket assembly 100 may be made by adding mounting holes on the adjustable back bracket 120 shown in FIGS. 2B, 3A and 3B, or by replacing adjustable back bracket 120 with a larger back bracket, with different (appropriately positioned) mounting holes, in order to accommodate other boxes, e.g., octagonal or square boxes. Field installable support bracket assembly 100 may be installed to provide support for different gangable boxes, such as a 2-gang box, a 3-gang box, a 4-gang box, etc.

Figure 4:
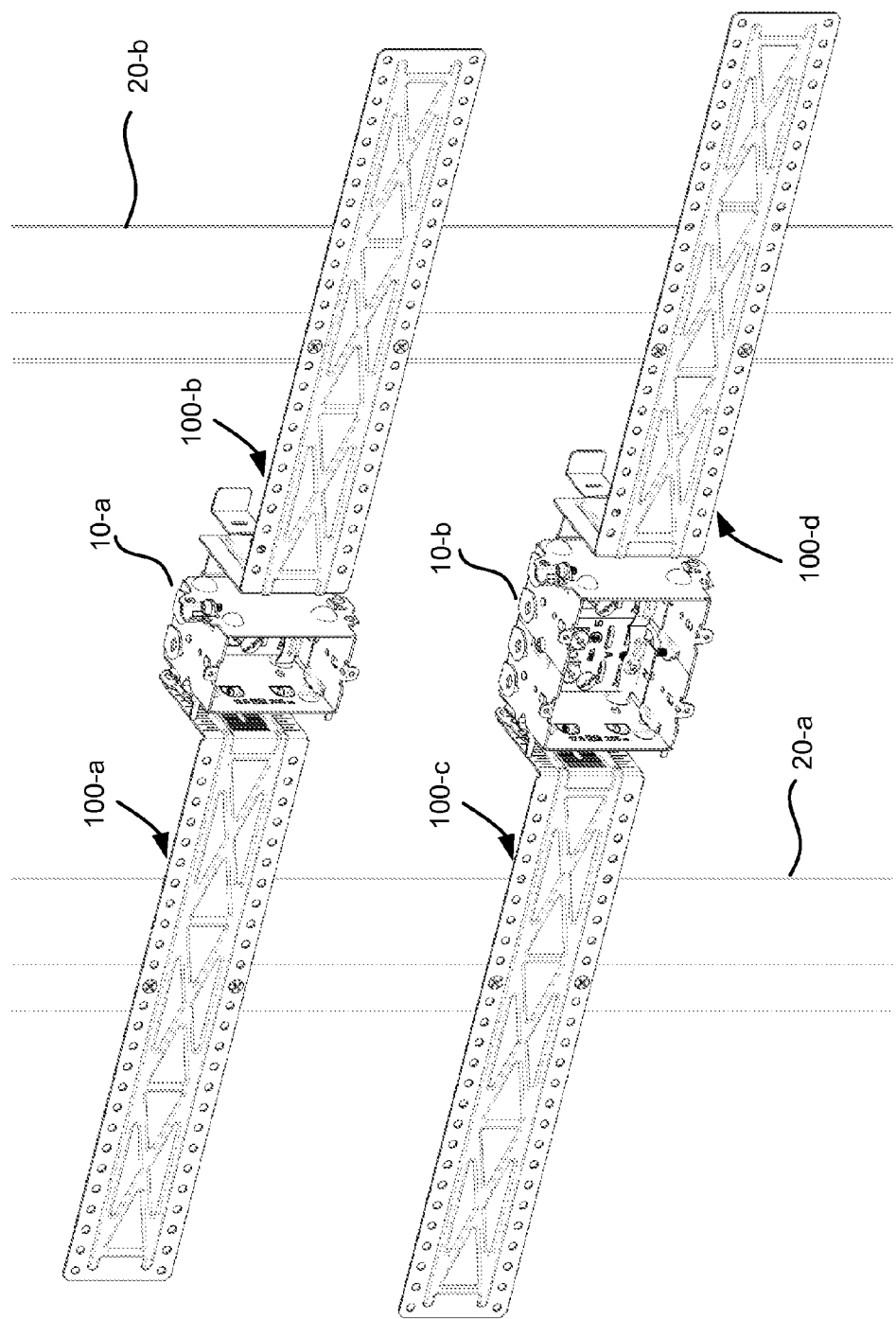
FIG. 4 provides a perspective view of paired field installable support bracket assemblies that support electrical boxes between structural studs.

FIG. 4 provides a perspective view of pairs of field installable support bracket assemblies 100 (field installable support bracket assemblies 100-a and 100-b and field installable support bracket assemblies 100-c and 100-d) that are installed to support, respectively, a single gang electrical box 10-a and a multi-gang electrical box 10-b between structural studs 20-a and 20b.

By using two field installable support bracket assemblies 100, electrical box 10 may be supported between studs 20-a and 20b as shown in FIG. 4. One end of each of the field installable support bracket assemblies 100 may be attached to a side of electrical box 10 using its respective adjustable back bracket 120, as described above with respect to FIGS. 3A and 3B. The stud brackets 110 of the two field installable support bracket assemblies 100 may be fastened to the front surfaces of supporting studs 20-a and 20-b, as illustrated in FIG. 4. In this manner, an electrical box may be placed between studs and be provided with structural support.

As shown in FIG. 4, electrical boxes 10 may be positioned with respect to structural studs 20-a and 20b based on positioning of mounting screws 124 for each stud bracket 110. For example, electrical boxes 10-a and 10-b may be positioned in a center position relative to structural studs 20-a and 20b. Alternatively, electrical boxes 10-a and 10-b may be positioned in an off-center position (not shown) relative to structural studs 20-a and 20b.

Figure 5:
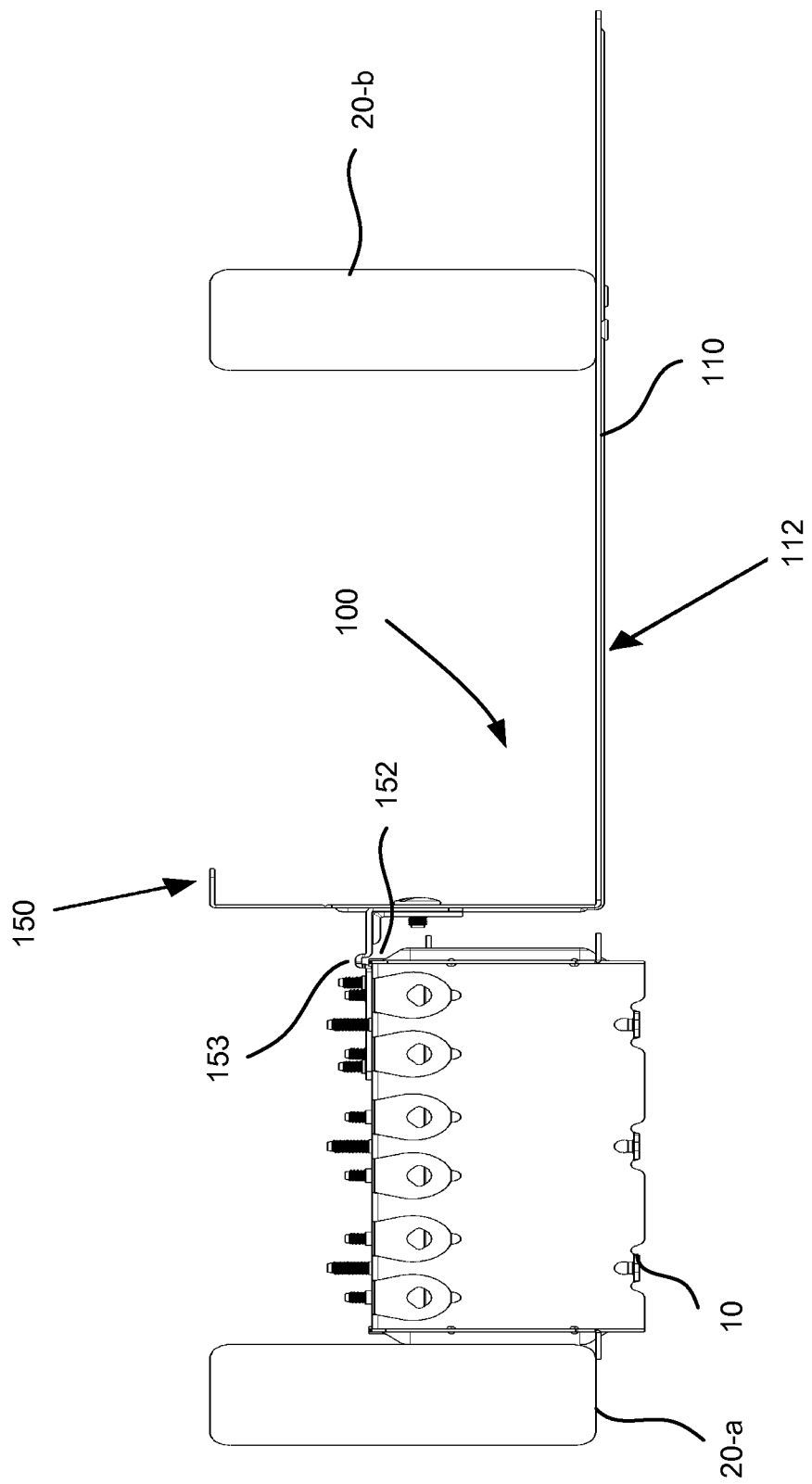
FIG. 5 provides a top view of the bracket of FIG. 1.

FIG. 5 provides a top view of field installable support bracket assembly 100 after drywall (not shown) installation on both stud (20-a and 20-b) faces. Field installable support bracket assembly 100 may include a back support 150.

As shown in FIG. 5, field installable support bracket assembly 100 may be installed with stud bracket 110 positioned with its front face 112 located adjacent or abutting the front drywall and back support 150 of adjustable back bracket 120 on the back drywall, increasing the whole assembly's rigidity. That is, adjustable back bracket 120 may be aligned such that the front of electrical box 10 (shown inverted in FIG. 5) is flush with the front of the drywall and back support 150 is flush with another piece of drywall on the back side. Back support 150 may be configured to be positioned in contact with an inner surface of a back drywall sheet. Adjustable back bracket 120 may also include a guide indentation 152 (below protrusion 153) that may receive a lower edge of electrical box 10 (i.e., In this instance the lower edge of electrical box 10 fits upward into guide indentation 152).

Figure 6:
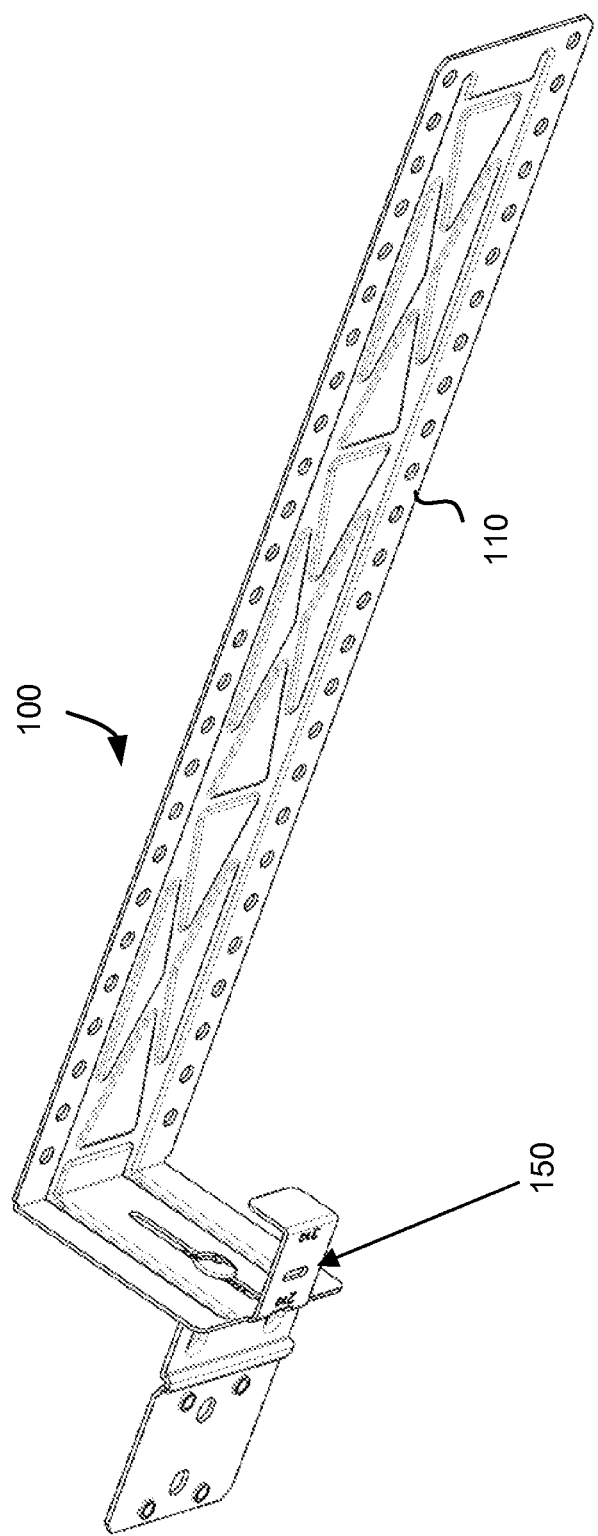
FIG. 6 provides a back perspective view of the bracket of FIG. 1, with a back support bent for a smaller dimension stud.

FIG. 6 provides a back perspective view of field installable support bracket assembly 100 with back support 150 bent for a shorter structural stud 20. For example, as shown in above FIGS. 1-5, field installable support bracket assembly 100 was shown for use with longer structural studs having a greater depth, for instance 2" (w)×4" (d) studs. For use with shorter structural studs 20 that are not as deep, such as 2"×3" studs, the bracket's back support 150 may be bent at an approximately 90° angle as shown in FIG. 6.

Figure 7A:
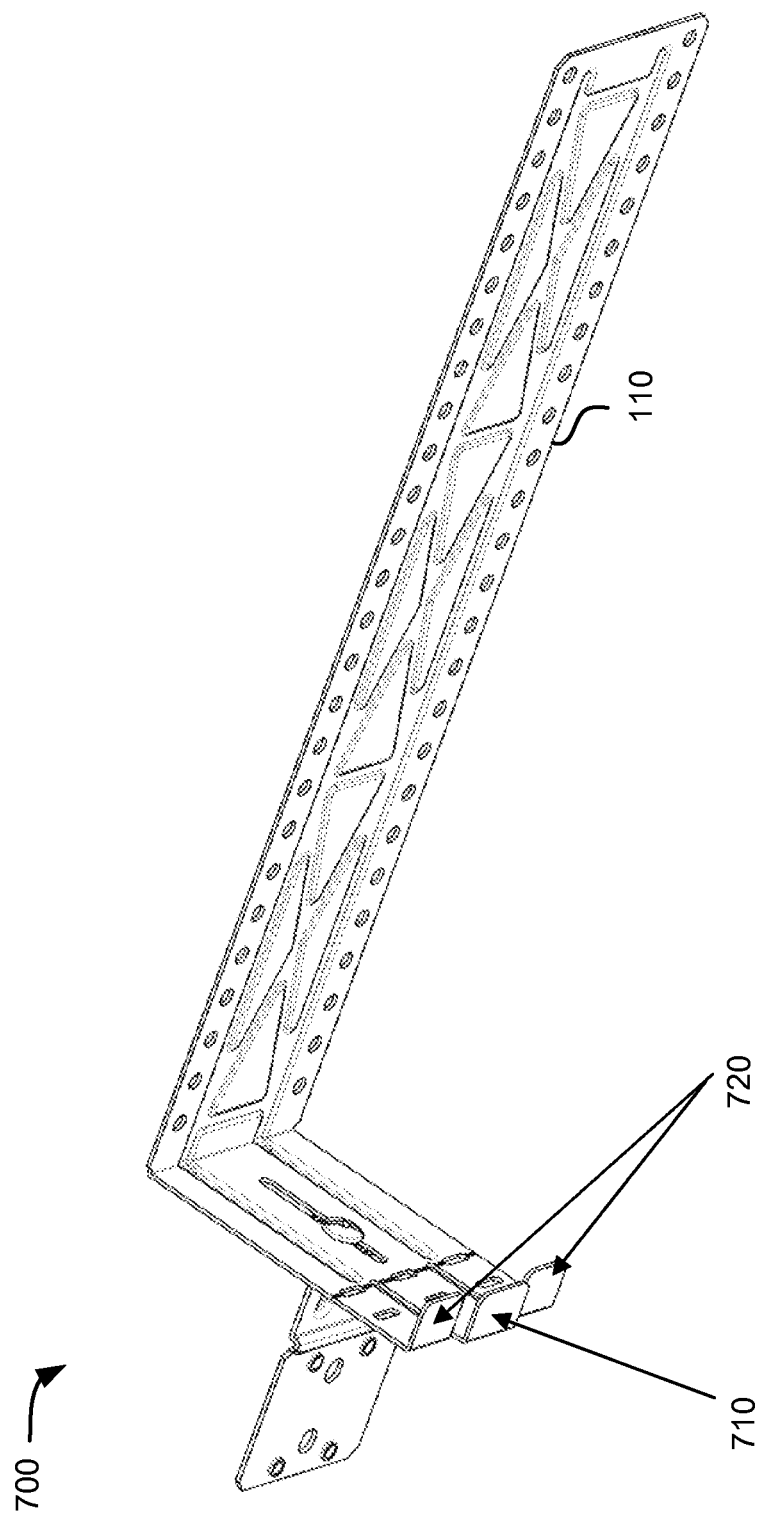
FIG. 7A provides a back perspective view of an alternative field installable support bracket assembly that includes back supports configurable for steel stud or wood stud applications.
Figure 7B:
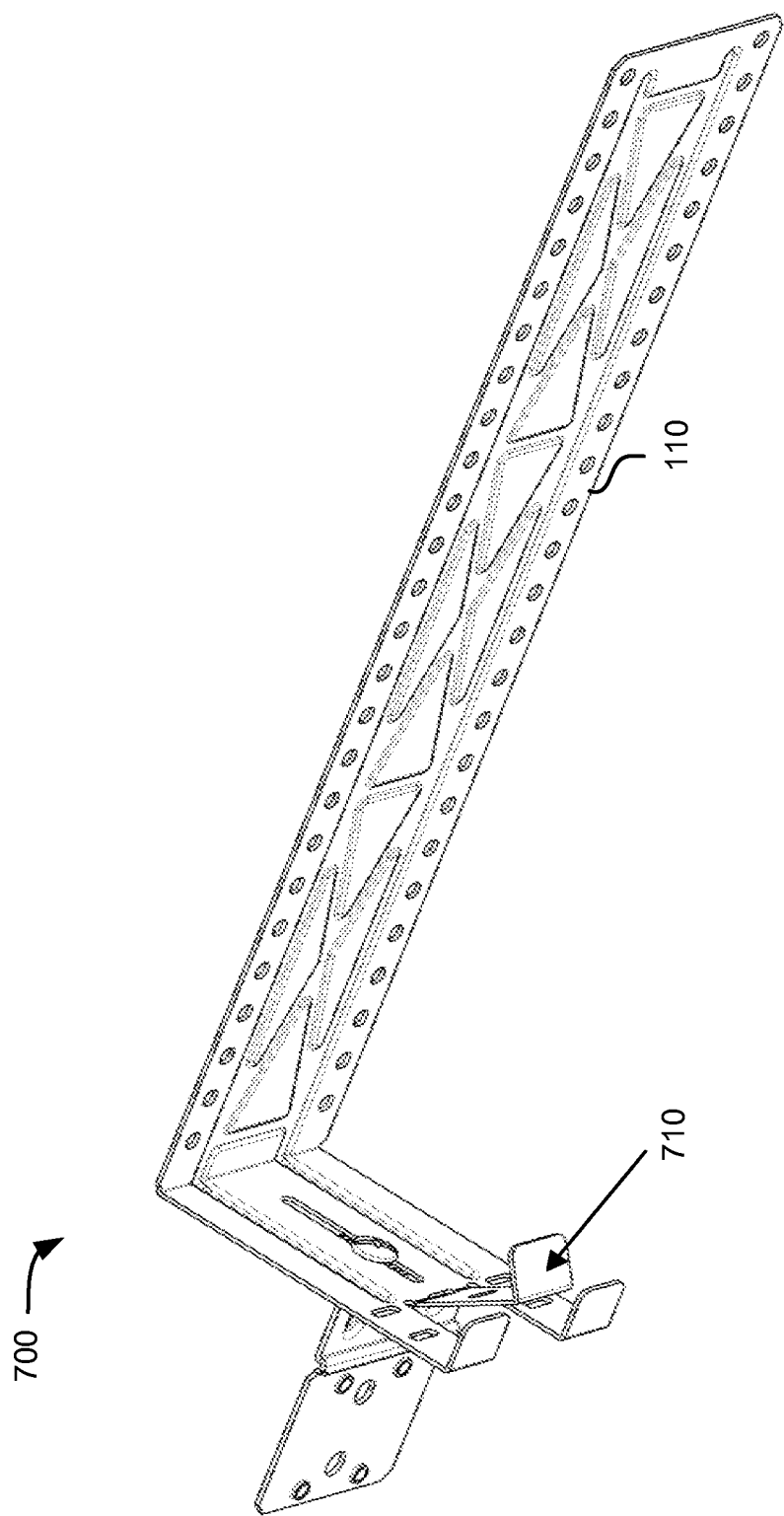
FIG. 7B provides a back perspective view of the alternative field installable support bracket assembly of FIG. 7A that includes a longer back support bent for wood studs.
Figure 7C:
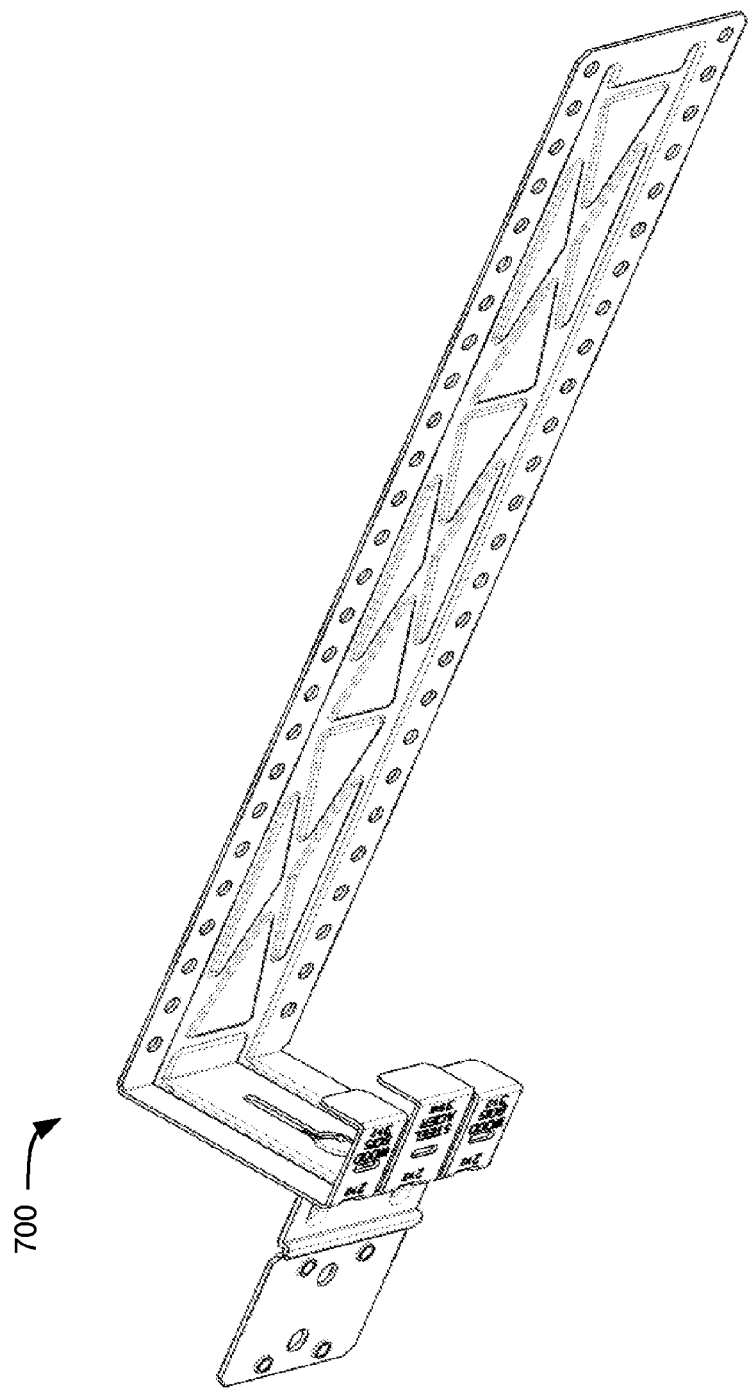
FIG. 7C provides a back perspective view of the alternative field installable support bracket assembly of FIG. 7A that includes all back supports bent for smaller studs.

FIGS. 7A-7C provide back perspective views of an alternative field installable support bracket assembly 700 configured for installing electrical box 10 in multiple different stud applications (e.g., for both wood stud and steel stud applications).

As shown in FIG. 7A, alternative field installable support bracket assembly 700 may include multiple back supports (back support 710 and back supports 720) configured for installation with structural studs 20 of different depths. For example, a standard steel stud depth of 3⅝ inches is larger than a standard wood stud depth of 3½ inches. Alternative field installable support bracket assembly 700 may include 3 back supports on the adjustable back bracket 120: two shorter back supports 720 for use with awood stud and one longer back support 710 for use with a steel stud.

For larger structural studs 20, such as steel stud applications, alternative field installable support bracket assembly 700 may be installed as shown in FIG. 7A. All back supports (710 and 720) may be maintained in an upright position (i.e., none of the back supports 710 and 720 are bent) so that the longest back support (back support 710) effectively forms the back support for alternative field installable support bracket assembly 700 (e.g., for standard steel studs of 3⅝ inches).

For structural studs 20 having a smaller depth, such as wood stud applications, alternative field installable support bracket assembly 700 may be installed as shown in FIG. 7B. Larger back supports 710 may be bent inwardly so that the point of contact between a back drywall and the back supports occurs at the relatively shorter back supports 720 when alternative field installable support bracket assembly 700 is installed. Relatively shorter back supports 720 may be maintained in an upright position to effectively form the back support for alternative field installable support bracket assembly 700. For example, alternative field installable support bracket assembly 700 may be installed for use on standard wood studs (e.g., depth of 3½ inches).

All back supports (710 and 720) may be bent for stud applications that require installation of alternative field installable support bracket assembly 700 with shorter structural studs as shown in FIG. 7C. For example, if longer back support 710 is provided for installation of steel studs 20 with a depth (i.e., from back drywall to front drywall when installed) of 3⅝ inches, and relatively shorter back supports 720 are provided for installation of standard wood studs, both types of back supports (710 and 720) may be bent to provide a point of contact for wood or steel studs with a depth less than 3½ inches, such as a depth of 2½ inches.

Generally, the distance between electrical box 10 and stud 20 may vary between one-half inch and four inches. Although alternative field installable support bracket assembly 700 is described with respect to particular stud applications, in other implementations, the material type, material thickness, and/or primary bracket dimensions of assemblies 100/700 may be altered to achieve a different range of distances between electrical box 10 and stud 20. The alternate construction shown in FIGS. 7A-7C may be implemented for multiple stud applications based on a placement and stability of the different back supports. For example, an additional pair of back supports (not shown) may be provided for studs greater than the 3⅝ depth of steel stud 20.

Implementations described herein provide a field installable support bracket assembly that supports an electrical box installed on a first structural stud. The electrical box may be adjusted based on a positioning system of the electrical box without regard to drywall thickness. The field installable support bracket assembly may be installed between the electrical box and a second structural stud after the box is installed on the first structural stud. The field installable support bracket assembly may include an adjustable back bracket and a stud bracket. The adjustable back bracket is attachable to the electrical box. The stud bracket is attachable to a front surface of the second structural stud. The field installable support bracket assembly may provide a rigid support. In one implementation, an alternative field installable support bracket assembly may include multiple back supports that may be bent to allow installation of the alternative field installable support bracket assembly with different structural studs.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, by replacing the back bracket 120 described above with a larger one, with different mounting holes, field installable support bracket assembly may accommodate other gangable boxes, i.e., octagonal or square boxes.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A field installable support bracket assembly for an electrical box, wherein the electrical box is to be secured to a side surface of a first structural stud, comprising:
   a stud bracket including:
      a stud bracket member configured to be secured to a front surface of a second structural stud, and
      a stud bracket guiding rib, wherein the stud bracket guiding rib is configured to be substantially perpendicular to the stud bracket member; and
   an adjustable back bracket including:
      a mounting panel configured to be secured to a back of the electrical box,
      a back bracket guiding rib, wherein the back bracket guiding rib and the stud bracket guiding rib are configured to join the stud bracket to the adjustable back bracket; and
   wherein the field installable support bracket assembly is configured to provide support for the electrical box.

2. The assembly of claim 1, wherein the back bracket guiding rib and the stud bracket guiding rib are configured to be moveable to adjust a position of the adjustable back bracket with respect to the stud bracket guiding rib; and
   wherein the back bracket guiding rib and the stud bracket guiding rib are configured to be rigidly joined via a mounting screw connecting the stud bracket guiding rib to the adjustable back bracket.

3. The assembly of claim 1, wherein the stud bracket guiding rib includes measurement markings along a plane of adjustment of the adjustable back bracket.

4. The assembly of claim 1, wherein the stud bracket member includes a plurality of mounting holes configured to receive a fastener to attach the stud bracket at one of a range of distances along the front surface of the second structural stud.

5. The assembly of claim 1, wherein the adjustable back bracket further comprises:
   a back support configured to be positioned in contact with an inner surface of a back drywall sheet to provide support for the assembly.

6. The assembly of claim 5, wherein the back support is configured be selectively bent to permit adjustment of the assembly to at least one additional depth with respect to the first structural stud.

7. The assembly of claim 1, wherein the adjustable back bracket is configured to be attached to the electrical box after the electrical box is installed on the first structural stud.

8. The assembly of claim 1, wherein the adjustable back bracket includes mounting holes configured to be aligned with mounting holes of the electrical box.

9. The assembly of claim 1, wherein the adjustable back bracket is configured to be attached to an electrical box having one of a single gang configuration, a double gang configuration, a triple gang configuration, a quadruple gang configuration, an octagon configuration, or a square configuration.

10. The bracket assembly of claim 1, wherein the adjustable back bracket further includes a guide indentation configured to receive a lower edge of the electrical box.

11. A field installable support bracket assembly for an electrical box, comprising:
   a stud bracket including:
      a stud bracket member configured to be secured to a front surface of a first structural stud, and
      a stud bracket guiding rib; and an adjustable back bracket including:
- a mounting panel configured to be secured to a back of the electrical box,
- a back bracket guiding rib, wherein the back bracket guiding rib and the stud bracket guiding rib are configured to join the stud bracket to the adjustable back bracket; and wherein the assembly is configured to be implemented in a paired configuration with a second field installable support bracket assembly to support the electrical box, wherein the second field installable support bracket assembly is attached on an opposite side of the electrical box to the field installable support bracket assembly and a stud bracket member of the second field installable support bracket assembly is secured to a front surface of a second structural stud.

12. The assembly of claim 11, wherein the adjustable back bracket further comprises:
- a back support configured to be positioned in contact with an inner surface of a back drywall sheet to provide support for the assemblies.

13. The assembly of claim 11, wherein the adjustable back bracket is configured to be attached to an electrical box having one of a single gang configuration, a double gang configuration, a triple gang configuration, a quadruple gang configuration, an octagon configuration, or a square configuration.

14. A field installable support bracket assembly for an electrical box, comprising:
- a stud bracket including:
  - a stud bracket member configured to be secured to a front surface of a first structural stud, and
  - a stud bracket guiding rib; and
- an adjustable back bracket including:
  - a mounting panel configured to be secured to a back of the electrical box,
  - a back bracket guiding rib, wherein the back bracket guiding rib and the stud bracket guiding rib are configured to join the stud bracket to the adjustable back bracket, and
  - a plurality of back supports configured be selectively adjusted to permit use of the field installable support bracket assembly to one of a plurality of depths with respect to the first structural stud; and wherein the field installable support bracket assembly is configured to provide support for the electrical box.

15. The assembly of claim 14, wherein the back bracket guiding rib and the stud bracket guiding rib are configured to be moveably connected to adjust a position of the adjustable back bracket with respect to the stud bracket; and
wherein the back bracket guiding rib and the stud bracket guiding rib are configured to be rigidly joined via a mounting screw.

16. The assembly of claim 15, wherein the stud bracket guiding rib includes measurement markings along a plane of adjustment of the adjustable back bracket.

17. The assembly of claim 14, wherein the stud bracket member includes a plurality of mounting holes configured to receive a fastener to connect the stud bracket at one of a range of distances along the front surface to the first structural stud.

18. The assembly of claim 14, wherein the plurality of back supports are configured to be used with studs having a 3½ inch depth, a 3⅝ inch depth, and a 2½ inch depth.

19. The assembly of claim 14, wherein the adjustable back bracket includes mounting holes configured to be aligned with mounting holes of the electrical box.

20. The bracket assembly of claim 14, wherein the electrical box includes one of a single gang configuration, a double gang configuration, a triple gang configuration, a quadruple gang configuration, an octagon configuration, or a square configuration.

* * * * *

UNITED STATES PATENT AND TRADEMARK OFFICE
CERTIFICATE OF CORRECTION

| | |
|---|---|
| PATENT NO. | : 8,998,154 B2 |
| APPLICATION NO. | : 14/035353 |
| DATED | : April 7, 2015 |
| INVENTOR(S) | : Lupsa et al. |

It is certified that error appears in the above-identified patent and that said Letters Patent is hereby corrected as shown below:

In the Claims,

Claim 6, at column 6, line 44 should read: "configured to be selectively bent to permit adjustment of the"

Signed and Sealed this
Tenth Day of November, 2015

Michelle K. Lee
*Director of the United States Patent and Trademark Office*